(12) United States Patent
Lin

(10) Patent No.: US 9,022,331 B2
(45) Date of Patent: May 5, 2015

(54) SUCTION DEVICE

(71) Applicant: Buckingham Industrial Corporation, Jiangsu (CN)

(72) Inventor: Kuo-Chuan Lin, Taoyuan (TW)

(73) Assignee: Buckingham Industrial Corporation, Jiangsu (CN)

( * ) Notice: Subject to any disclaimer, the term of this patent is extended or adjusted under 35 U.S.C. 154(b) by 2 days.

(21) Appl. No.: 13/932,846

(22) Filed: Jul. 1, 2013

(65) Prior Publication Data

US 2014/0353445 A1     Dec. 4, 2014

(30) Foreign Application Priority Data

Jun. 4, 2013 (CN) .......................... 2013 1 0219218
Jun. 4, 2013 (CN) ...................... 2013 2 0318807 U

(51) Int. Cl.
*A45D 42/14* (2006.01)
*F16B 47/00* (2006.01)

(52) U.S. Cl.
CPC ..................................... *F16B 47/00* (2013.01)

(58) Field of Classification Search
CPC ...................................................... F16B 47/00
USPC ........... 248/683, 548, 550, 467, 205.5, 205.7, 248/205.8, 206.2, 206.1, 205.6, 309.3, 362, 248/363, 537; 224/559
See application file for complete search history.

(56) References Cited

U.S. PATENT DOCUMENTS

| | | | | |
|---|---|---|---|---|
| 2,871,615 | A * | 2/1959 | Borah | 248/346.11 |
| 2,910,264 | A * | 10/1959 | Lindenberger | 248/362 |
| 2,918,282 | A * | 12/1959 | Waterval | 482/94 |
| 3,514,065 | A * | 5/1970 | Donaldson et al. | 248/363 |
| 4,421,288 | A * | 12/1983 | Blaszkowski | 248/205.4 |
| 4,919,986 | A * | 4/1990 | Lay et al. | 428/43 |
| 5,263,760 | A * | 11/1993 | Sohol | 296/97.7 |
| 5,438,457 | A * | 8/1995 | Moore | 359/855 |
| 5,685,513 | A * | 11/1997 | Tsukushi | 248/363 |
| 6,053,464 | A * | 4/2000 | Cardarelli | 248/205.8 |
| 6,213,440 | B1 * | 4/2001 | Kornback | 248/514 |
| 7,837,162 | B2 * | 11/2010 | Adams | 248/205.5 |
| 8,196,790 | B2 * | 6/2012 | Iida et al. | 224/483 |
| 8,376,295 | B2 * | 2/2013 | Hao et al. | 248/206.2 |
| 8,681,492 | B2 * | 3/2014 | Fan | 361/679.58 |
| 2002/0185575 | A1 * | 12/2002 | Kalb | 248/205.5 |

* cited by examiner

*Primary Examiner* — Terrell McKinnon
*Assistant Examiner* — Michael McDuffie
(74) *Attorney, Agent, or Firm* — WPAT, P.C.; Anthony King

(57) ABSTRACT

A suction device includes an elastic base and a release structure connected operably to the elastic base. The elastic base has a peripheral portion for to hermetically contacting a contact surface and defining a vacuum chamber therebetween when a predetermined external force is applied on the elastic base, thereby mounting the elastic base on the contact surface. The release structure has a projection protruding outwardly and partially from the elastic base when an applied force on the elastic base is greater than the predetermined external force and retracting inwardly within the elastic base so as to be disposed in the vacuum chamber when the elastic base is mounted on the contact surface such that a distance between a protruding end of the projection and the contact surface is greater than zero.

11 Claims, 3 Drawing Sheets

SUCTION DEVICE

BACKGROUND OF THE INVENTION

1. Field of the Invention

The present invention relates generally to a suction device, more particularly a suction device that can be easily and quickly removed from a contact surface upon which the suction device is mounted.

2. The Prior Arts

A suction device adapted to be mounted on a contact surface is widely used in our daily life, such as for hanging cooking utensils or a connection cable. Thus, the suction strength thereof relative to the contact surface is a major research in this field for the manufacturers of the suction device.

Conventionally, it is convenient to mount the suction device securely on a contact surface. Owing to the fact that the contact surface is generally smooth and slippery, the manufacturers encounter the problems of how quickly and easily remove the suction device from the contact surface in addition to the increasing suction strength of the suction device.

Regarding removal of the suction device from the contact surface, a conventional method presently employs a principle of lever or via other auxiliary tool via which the external pressure is allowed to flow into the vacuum chamber of the suction device when the former is mounted on the contact surface, thereby facilitating removal of the suction device from the contact surface. Another method of removal is applying a relatively large external pressure upon the suction device for releasing the former from the contact surface. However, such way of releasing the suction device from the contact surface is not beneficial to the user since it may result in deformation or ruin of the suction device, and the worst may injure the user of the suction device. Moreover, in case several pieces of suction devices are mounted on the contact surface in order to hang a specific article thereon, the above method of removing the suction devices one by one may result in unbalance of the entire suction device. As a result, those persons in the relevant art are urgently developing and researching a way to quickly and easily removing the suction device or devices from the contact surface.

Presently, the following methods are used for removing the conventional suction device from the contact surface; (i) providing several ribs on the outer surface of the suction device in order to peel the peripheral portion of the suction device off the contact surface so that the external pressure can get interior of the vacuum chamber, thereby facilitating in removal of the suction device from the contact surface; (ii) forming at least one air chamber on the outer surface of the suction device so that the air confined within the air chamber can be squeezed out for mounting the suction device on the contact surface or expanding the air chamber for removing the suction device from the contact surface; and (iii) forming pressure-releasing elements on the peripheral portion of the suction device and when it is desired to remove the suction device from the contact surface, the user can manipulate the pressure-releasing elements in such a way that the external pressure can flow into the vacuum chamber, thereby facilitating in removal of the suction device from the contact surface. The above implementation encounters the following disadvantages: (i) a relatively large amount of force is needed to apply on the rib so as to rotate about a fulcrum; (ii) excessively expanding the air chamber so as to increase the suction strengthen can result in no external pressure flowing in the vacuum chamber, thereby resulting in difficulties of removal of the suction device from the contact surface; and (iii) formation of the pressure-releasing elements on the peripheral portion of the suction device results in bulky size and hence results in extra manufacturing expense.

Hence, without decreasing the existing suction strength and how easy and quickly it is to remove the suction device from the contact surface are the main problems existing in the present days to be solved by the manufacturers of the suction device.

SUMMARY OF THE INVENTION

A primary object of the present invention is to provide a suction device that can be easily and quickly removed from a contact surface without decreasing the initial suction strength thereof.

Another object of the present invention is to provide a suction device that includes an elastic base and a release structure connected operably to the elastic base. The elastic base has a peripheral portion adapted to hermetically contact a contact surface and define a vacuum chamber therebetween when a predetermined external force is applied on the elastic base, thereby mounting the elastic base on the contact surface. The release structure has a projection protruding outwardly and at least partially from the elastic base when an applied force on the elastic base is greater than the predetermined external force and retracting inwardly within the elastic base so as to be disposed in the vacuum chamber when the elastic base is mounted on the contact surface such that a distance between a protruding end of the projection and the contact surface is greater than zero.

Preferably, the release structure has a plurality of the projections.

To be more specific, each of the projections is spring-loaded so as to provide resilience.

More preferably, the elastic base includes a dome-shaped elastic body.

In the present embodiment, each of the spring-loaded projections is mounted concentrically on the dome-shaped elastic body.

In the present embodiment, the dome-shaped elastic body and the projection of the release structure are integrally formed relative to each other.

More preferably, the suction device of the present invention further includes a pressure-assisting structure defining the dome-shaped elastic body for deforming the shape of the elastic base such that the elastic base forms the vacuum chamber together with the contact surface when the predetermined external force is applied on the dome-shaped elastic body.

The suction device of the present invention can be manipulated easily in order to remove from the contact surface without decreasing the initial suction strength thereof.

BRIEF DESCRIPTION OF THE DRAWINGS

Other features and advantages of the present invention will become more apparent in the following detailed description of the preferred embodiment of this invention with reference to the accompanying drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
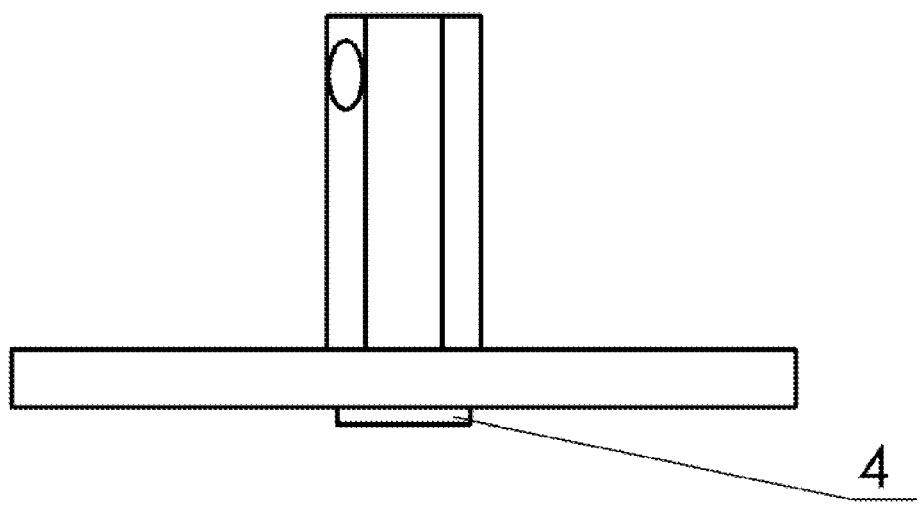
FIG. 1 is a schematic side view of the preferred embodiment of a suction device of the present invention.
Figure 2:
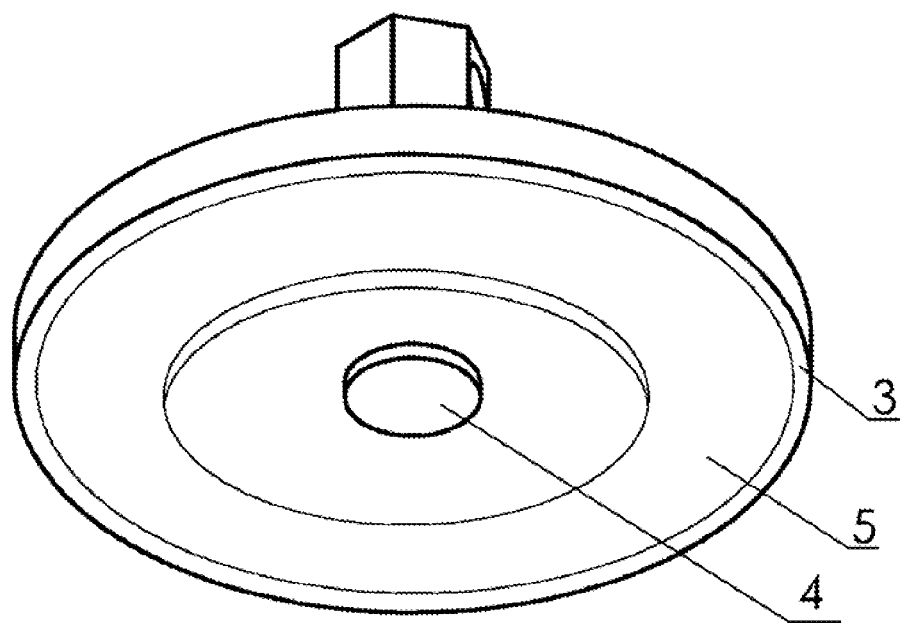
FIG. 2 is a perspective view of the preferred embodiment of the suction device of the present invention.
Figure 3:
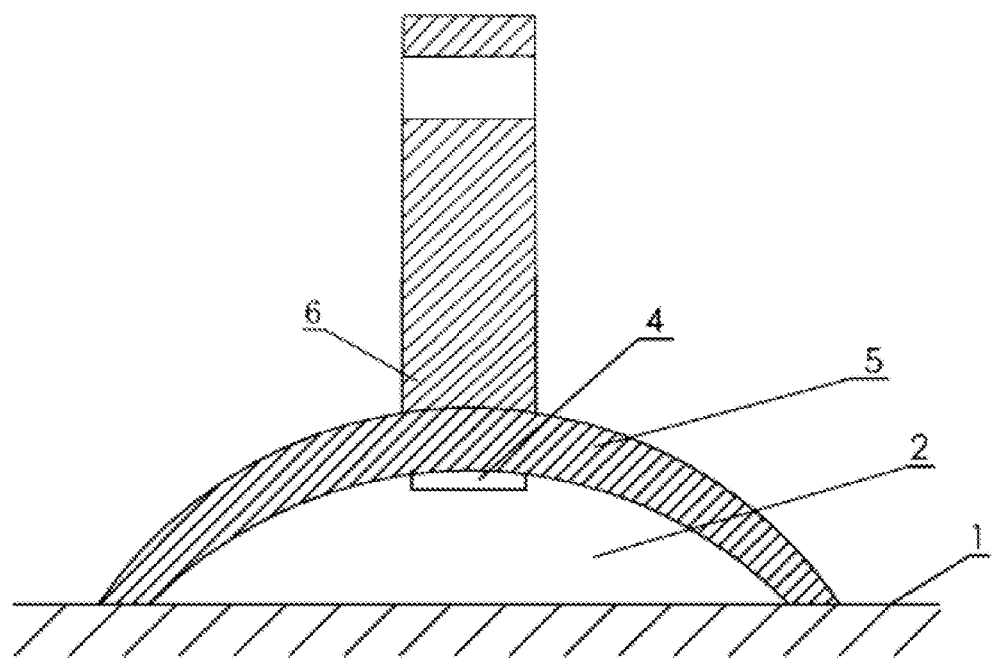
FIG. 3 is a cross-sectional view of the preferred embodiment of the suction device of the present invention mounted on a contact surface.

Referring to FIGS. 1-3, wherein FIG. 1 is a schematic side view of the preferred embodiment of a suction device of the present invention; FIG. 2 is a perspective view of the preferred embodiment of the suction device of the present invention; and FIG. 3 is a cross-sectional view of the preferred embodiment of the suction device of the present invention mounted on a contact surface 1. As illustrated, the suction device of the present invention includes an elastic base 5 and a release structure 6. The elastic base 5 has a peripheral portion 3 adapted to hermetically contact the contact surface 1 when a predetermined external force is applied on the elastic base 5 and defines a vacuum chamber 2 therebetween, thereby mounting the elastic base 5 on the contact surface 1, as best shown in FIG. 1. The release structure 6 is connected operably to the elastic base 5, and has a projection 4 protruding outwardly and at least partially from the elastic base 5 when an applied force on the elastic base 5 is greater than the predetermined external force and retracting inwardly within the elastic base 5 so as to be disposed in the vacuum chamber 2 when the elastic base 5 is mounted on the contact surface such that a distance between a protruding end of the projection 4 and the contact surface 4 is greater than zero (see FIG. 1).

To be more specific, the release structure 6 has a plurality of the projections 4 (only one is shown in the drawing). Preferably, each of the projections 4 is spring-loaded so as to provide resilience.

In the preferred embodiment, each of the spring-loaded projections 4 is mounted concentrically on the elastic base 5. Alternatively, each spring-loaded projection 4 can be eccentrically on the elastic base 5 so long as the spring-loaded projection 4 will be disposed within the vacuum chamber 2 when the elastic base 5 is mounted on the contact surface 1. The shape or configuration of the projection is not restricted, may be rectangular, cylindrical cross section, a diamond shape or irregular shape and the size of the projection can be varied in accordance with the dimension of the elastic base 5, for instance, when the projection 4 is disposed concentrically relative to the elastic base 5 and when the elastic base 5 is mounted on the contact surface 1, the protruding end of the projection 4 retracts and is kept within the vacuum chamber 2 at a relatively high position with respect to the contact surface 1 as best shown in FIG. 3.

In the preferred embodiment, the elastic base 5 preferably includes a dome-shaped elastic body, which is easily deformed so as to form the vacuum chamber 2 together with the contact surface 1 upon application of an external pressure, thereby mounting on the contact surface 1.

In the preferred embodiment, the dome-shaped elastic body and the projection 4 are integrally formed relative to each other.

In order to facilitate application of the suction device of the present invention, the suction device further includes a pressure-assisting structure defining the dome-shaped elastic body that deforms when the predetermined external force is applied on the dome-shaped elastic body.

Regarding the material for construction of the elastic base 5 as well as the projection 4, some flexible substance should be selected so that the projection 4 is integrally formed with the dome-shaped elastic body and the latter provides hermetically sealing effect when mounted on the contact surface 1.

As best shown in FIG. 3, when the suction device of the present invention is mounted on the contact surface 1, the protruding end of the projection 4 is disposed within the vacuum chamber 2 and is spaced apart from the contact surface 1. When an external force greater than the predetermined external pressure is applied on the dome-shaped elastic body, can result in pushing of the protruding end of the projection 4 into the dome-shaped elastic body and will come into contact with the contact surface 1 such that the external pressure flows into the vacuum chamber 2 via a gap formed between the peripheral portion 3 of the suction device and the contact surface 1 till no pressure difference exist as the elastic base 5 retrieves its initial shape. In other words, the elastic base 5 easily and quickly retrieves it initial shape and the user needs not apply a tremendously large amount of energy for peeling the peripheral portion 3 of the suction device of the present invention off the contact surface 1, thereby saving the labor waste.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A suction device comprising:
   an elastic base having a peripheral portion adapted to hermetically contact a contact surface and define a vacuum chamber therebetween when a predetermined external force is applied on said elastic base, thereby mounting said elastic base on the contact surface; and
   a release structure connected operably to said elastic base and having a projection protruding outwardly and at least partially from said elastic base when an applied force on said elastic base is greater than the predetermined external force and retracting inwardly within said elastic base so as to be disposed in said vacuum chamber,
   wherein when said elastic base is mounted on the contact surface, a distance between a protruding end of said projection and the contact surface is greater than zero,
   wherein an external force greater than the predetermined external force applied on said elastic base can result in pushing said protruding end of said projection to come into contact with the contact surface, thereby forming a gap between said peripheral portion of said elastic base and said contact surface such that external pressure can flow into said vacuum chamber via said gap to release the suction device from the contact surface.

2. The suction device according to claim 1, wherein said projection is resilient.

3. The suction device according to claim 2, wherein said projection is mounted concentrically on said elastic base.

4. The suction device according to claim 1, wherein said elastic base includes a dome-shaped elastic body.

5. The suction device according to claim 2, wherein said elastic base includes a dome-shaped elastic body.

6. The suction device according to claim 3, wherein said elastic base includes a dome-shaped elastic body.

7. The suction device according to claim 2, wherein said elastic base and said projection of said release structure are integrally formed relative to each other.

8. The suction device according to claim 3, wherein said elastic base and said projection of said release structure are integrally formed relative to each other.

9. The suction device according to claim 1, wherein said elastic base includes a dome-shaped elastic body, the suction device further comprising a pressure-assisting structure defining said dome-shaped body for deforming the shape of said elastic base such that said elastic base forms said vacuum chamber together with the contact surface when the predetermined external force is applied on said dome-shaped elastic body.

10. The suction device according to claim 2, wherein said elastic base includes a dome-shaped elastic body, the suction device further comprising a pressure-assisting structure defining said dome-shaped body for deforming the shape of said elastic base such that said elastic base forms said vacuum chamber together with the contact surface when the predetermined external force is applied on said dome-shaped elastic body.

11. The suction device according to claim 3, wherein said elastic base includes a dome-shaped elastic body, the suction device further comprising a pressure-assisting structure defining said dome-shaped body for deforming the shape of said elastic base such that said elastic base forms said vacuum chamber together with the contact surface when the predetermined external force is applied on said dome-shaped elastic body.

* * * * *